United States Patent [19]
Kreusch et al.

[11] 3,772,189
[45] Nov. 13, 1973

[54] IODINE TREATED ACTIVATED CARBON AND PROCESS OF TREATING CONTAMINATED WATER THEREWITH

[75] Inventors: Edward G. Kreusch, Arlington Heights; Farouk F. Husseini, Mundelein, both of Ill.

[73] Assignee: Culligan Inc., Northbrook, Ill.

[22] Filed: Jan. 27, 1972

[21] Appl. No.: 221,436

Related U.S. Application Data

[63] Continuation-in-part of Ser. No. 95,328, Dec. 4, 1970, abandoned.

[52] U.S. Cl. .................................. 210/40, 210/62
[51] Int. Cl. .............................................. C02b 1/36
[58] Field of Search ....................... 210/62, 40, 36

[56] References Cited
UNITED STATES PATENTS

| | | | |
|---|---|---|---|
| 2,055,475 | 9/1936 | Behrman | 210/62 |
| 3,425,790 | 2/1969 | Sloan | 210/62 |
| 2,701,792 | 2/1955 | Owen | 210/62 X |

FOREIGN PATENTS OR APPLICATIONS

| | | | |
|---|---|---|---|
| 493,069 | 9/1938 | Great Britain | 210/62 |

*Primary Examiner*—Michael Rogers
*Attorney*—Benjamin H. Sherman et al.

[57] ABSTRACT

A process of treating water with activated carbon which has been made bacteriostatic by the homogeneous absorption of iodine thereby. The activated carbon is treated with an iodine solution to provide a reversible absorption of the elemental iodine by the carbon so that the carbon will release the iodine to treat contaminated water.

2 Claims, No Drawings

1

IODINE TREATED ACTIVATED CARBON AND PROCESS OF TREATING CONTAMINATED WATER THEREWITH

CROSS-REFERENCE TO RELATED APPLICATION

This application is a continuation-in-part of our copending U.S. Pat. application entitled "IODINE TREATED ACTIVATED CARBON," Ser. No. 95,328, filed Dec. 4, 1970, and now abandoned.

BACKGROUND OF THE INVENTION

The present invention relates to a method of treating carbon, and more particularly to a process for treating water with activated carbon.

Carbon is well known both for its properties of adsorption and absorption in the treatment of liquids or gases. Activated carbon will absorb chlorine, but the chlorine is irreversibly absorbed and its properties are destroyed by the activated carbon. It would, therefore, be advantageous if a process were developed whereby chlorine or another halogen could be reversibly absorbed by activated carbon to impart new and desirable properties to activated carbon for treating contaminated water.

SUMMARY OF THE INVENTION

In view of the disadvantages of prior processes, we have developed a method of treating contaminated water with a bacteriostatic carbon bed. The method comprises the steps of treating an activated carbon bed with an iodine solution with the iodine being reversibly absorbed by the carbon, rinsing the carbon bed until the effluent is free of iodine, mixing the rinsed carbon bed by backwashing to an approximately 50 percent bed expansion to obtain a homogeneous iodine content within the bed, and passing bacterially contaminated water through the rinsed and mixed carbon bed containing a homogeneous distribution of iodine therein with the carbon releasing the previously absorbed elemental iodine to treat the water and thereby reduce the bacterial content thereof. The iodine solution which is passed through the carbon bed has a normality of between about 0.1 N and about 0.2 N and is passed through the carbon at a rate of between about 0.25 and about 1.25 gallons per minute per cubic foot of carbon.

An important object of the present invention is to provide a process of reversible absorption of iodine by activated carbon.

Another object of the present invention is to provide a method of treating a carbon bed to have a homogeneous distribution of iodine therein.

Still another object of the present invention is to provide a process of absorbing iodine in activated carbon so that the treated carbon becomes bacteriostatic in order to be effective for treating contaminated water.

Other objects, features and advantages of the invention will become apparent from the following description of the preferred embodiment thereof, although variations and modifications may be effected without departing from the spirit and scope of the novel concepts of the disclosure.

DESCRIPTION OF THE PREFERRED EMBODIMENTS

Activated carbon has been utilized in numerous water treating applications to remove color, taste and odor from a water supply passing through a bed of carbon. Carbon is known for its adsorption and absorption properties; however, in many instances the absorption process has been irreversible such as in the treatment of chlorine-bearing waters. Chlorine is irreversibly absorbed by an activated carbon filtering bed, and the absorbed chlorine will gradually build up until the treatment capacity of the carbon is exhausted. Accordingly, when this occurs, the carbon bed must be replaced with a fresh bed of activated carbon as the exhausted carbon bed cannot be rejuvenated. Also, the chlorine properties for the water are destroyed by the activated carbon.

The use of chlorine for the treatment of water as a germicide and sterilizing agent is widespread both in commercial and domestic applications. Most large cities in the United States treat the drinking water in a municipal water plant by the addition of an average of 1.2 to 2.4 parts per million of chlorine. The use of an activated carbon filter to remove residual and combined chlorine, and thus to remove any odor or taste imparted to the water will destroy the chlorine properties therein and the capacity of the carbon to remove chlorine and other organic compounds in the water are gradually depleted until the carbon must be discarded. As the chlorine removing capabilities of the activated carbon cannot be restored, the replacement of depleted carbon with fresh activated carbon becomes expensive.

According to the present invention, a method is provided wherein elemental iodine is absorbed by activated carbon in a reversible manner and the absorbed iodine imparts new and improved characteristics to the activated carbon used in filtering beds. Tests have shown that the activated carbon bed becomes bacteriostatic after it has been treated with iodine and the bacteriostatic property is advantageous and desirable in the treatment of water. Thus, the carbon bed will release free active iodine which it has reversibly absorbed to treat contaminated water. Also, according to the present invention, the iodine treated carbon bed is preferably backwashed in order to homogeneously disperse the iodine throughout the carbon bed.

In the present invention, the carbon bed is first treated with a quantity of iodine and then rinsed sufficiently with an effluent such as water, or with deionized water, until the effluent is free of any iodine. After the carbon bed has been thoroughly treated with iodine and rinsed with an effluent, it is mixed by backwashing to an approximately 50 percent bed expansion in order to obtain a homogeneous iodine content within the bed. Then, bacterially contaminated water is passed through the rinsed and mixed carbon bed with the carbon releasing the previously absorbed elemental iodine to treat the water and thus reduce the bacterial content thereof.

The iodine solution that is used to treat the carbon bed generally has a normality ranging between about 0.1 N and 0.25 N.

In treating and rinsing the carbon bed, the iodine solution and effluent is passed downflow through the carbon bed at a rate between about 0.25 and about 1.2 gallons per minute per cubic foot of carbon.

The carbon bed is mixed by backwashing in order to homogeneously disperse the iodine throughout the carbon bed. This is important since if the iodine were only on the surface or top of the bed then a bacterial growth could occur in another part of the bed and the bed would not be bacteriostatic throughout. Thus, the carbon bed would not be as effective for treating contaminated water.

The following examples will further illustrate the advantages of the present invention.

EXAMPLE I

Two columns, each having a 2 inch internal diameter, were both filled with $7 \times 10^{-3}$ cubic feet of activated carbon and arranged for flow of water therethrough. One column was left untreated while the other column was treated by passing a 0.1 N iodine solution downflow through the carbon bed at one-sixth gallons per minute per square foot for 1 hour. After treatment of the one column, both columns were rinsed with demineralized water at 0.5 gallons per minute per square foot for 1 hour. At the end of this time, no iodine was detectable in the effluent from either column.

Then, water containing coliform with a most probable number (mpn) of 4,850 per 100 milliliters was run in parallel through both the treated and untreated columns at a flow rate of 0.5 gallons per minute per square foot (1.2 gallons per minute per cubic foot of carbon). The effluent water from each column was analyzed for coliform after 144 gallons per cubic foot of carbon with the following results:

| Treated Carbon | 400/100 ml. mpn |
|---|---|
| Untreated Carbon | 1000/100 ml. mpn |

Also, the contaminated water was allowed to remain in both columns overnight. In the morning, three bed volumes were collected and analyzed for coliform with the following average results:

| Treated Carbon | Less than 1/100 ml. mpn |
|---|---|
| Untreated Carbon | 1250/100 ml. mpn |

The above Example clearly shows that the iodine treated carbon is bacteriostatic, whereas the untreated carbon is not.

EXAMPLE II

Similar to Example I, two columns were filled with $7 \times 10^{-3}$ cubic feet of activated carbon; one column remaining untreated while the other column was treated with a 0.1 N iodine solution downflow at one-sixth gpm/square foot for 1 hour. Then both columns were rinsed at 0.5 gpm/square foot for 1 hour with demineralized water, so that no iodine was detectable in the rinse effluent from either column.

Then, a 0.05 N sodium thiosulfate solution, a chemical reducing reagent (equivalent to 6,300 ppm of iodine), was passed in parallel through the treated and untreated columns at a flow at 0.5 gpm/square foot. The influent and effluent water was analyzed for thiosulfate by the standard iodine titration method, with the results shown in ppm equivalent of iodine:

| Gal./cu.ft. | Influent ppm | Effluent - ppm Treated | Untreated |
|---|---|---|---|
| 12 | 6300 | 63 | 4800 |
| 24 | 6300 | 126 | 6300 |
| 36 | 6300 | 882 | 6300 |
| 48 | 6300 | 1178 | 6300 |
| 60 | 6300 | 2600 | 6300 |
| 72 | 6300 | 3780 | 6300 |

EXAMPLE III

Similar to Examples I and II, three 2 inch internal diameter columns were each filled with 100 gms (4½ inches) of activated carbon; the columns were backwashed and allowed to stay under water overnight. A 0.25 N iodine solution (63,000 ppm) was passed downflow through two of the three columns at one-fourth gallons per minute per cubic foot for 40 minutes to a 2 ppm iodine leakage. Both columns were then rinsed with deionized water until the effluent was free of iodine. One of the treated columns was mixed by backwashing the bed at 50 percent bed expansion for five minutes.

Bacterially contaminated water was passed through the three carbon beds in parallel at 3 gpm/cu. ft. The average results from runs of 9,000 gal./cu.ft. and 5,000 gal./cu.ft. are as follows:

| | Coliform Colonies/ 100 ml. | Total Plate Colonies/ 100 ml. | Organic Carbon ppm C | Iodine $I_2$ ppm |
|---|---|---|---|---|
| Influent | 50-* | * | 8–14 | 0 |
| Effluent | | | | |
| 1. Treated mixed carbon | 0 | 0–10,000 | 6–5 | 1–10 |
| 2. Treated unmixed carbon | 0–10 | 0–* | 5–2.5 | 0 |
| 3. Untreated carbon | 10-* | * | 14–5.5 | 0 |

* Infinite number of colonies

Effluent iodine concentration in the mixed column varied during service from 0–5 ppm; however, when left overnight under static conditions, the concentration was as high as 10 ppm but dropped gradually to under 1 ppm as the run progressed.

Thus, it can be concluded that activated carbon reversibly absorbs elemental iodine from water to become bacteriostatic for the treatment of bacterially contaminated water. From these examples it has been found that iodine treated carbon produced the coliform count in a flowing stream better than did the untreated carbon. Also, as shown by the examples, iodine treated carbon did not permit coliform growth during static conditions while untreated carbon allowed such growth. Furthermore, a treated carbon bed mixed by backwashing was superior in all cases to an unmixed bed in its ability to kill bacteria.

We claim as our invention:

1. A method for treating carbon comprising the steps of:
    A. forming a bed of activated carbon,
    B. passing an iodine solution through said bed to reversibly absorb iodine by the carbon of said bed,
    C. rinsing said bed until the rinsing effluent is free of iodine, the iodine bed being capable of releasing iodine to treat contaminated water, and
    D. mixing the carbon in said so-rinsed bed by backwashing to an approximately 50 percent bed expansion to obtain a homogeneous iodine content within said bed.

2. The process of claim 1 wherein bacterially contaminated water is passed through said so rinsed and mixed iodine treated carbon bed thereby releasing the previously absorbed iodine to treat the water and reduce the bacterial content thereof.

* * * * *